United States Patent [19]

Savitsky et al.

[11] Patent Number: 4,964,685
[45] Date of Patent: Oct. 23, 1990

[54] CONNECTOR WITH PRECISION FIBER OPTIC ALIGNMENT CLAMP

[75] Inventors: Wallace R. Savitsky; Ronald R. Schaffer; Gary N. Warner, all of Harrisburg, Pa.

[73] Assignee: AMP Incorporated, Harrisburg, Pa.

[21] Appl. No.: 399,805

[22] Filed: Aug. 29, 1989

[51] Int. Cl.⁵ ............................................. G02B 6/36
[52] U.S. Cl. ................................................. 350/96.2
[58] Field of Search ............................ 350/96.2, 96.21

[56] References Cited

U.S. PATENT DOCUMENTS

| | | |
|---|---|---|
| 4,607,911 | 8/1986 | Rhodes ................................. 350/96.2 |
| 4,679,895 | 7/1987 | Huber ................................... 350/96.2 |
| 4,738,507 | 4/1988 | Palmquist ............................ 350/96.21 |
| 4,815,808 | 3/1989 | Honma et al. ....................... 350/96.2 |
| 4,834,487 | 5/1989 | Abendschein et al. ............. 350/96.2 |
| 4,834,489 | 5/1989 | Betzler et al. ....................... 350/96.2 |

FOREIGN PATENT DOCUMENTS 0097575  1/1984  European Pat. Off. ........... 350/96.2
3112000 10/1982  Fed. Rep. of Germany ..... 350/96.2

*Primary Examiner*—John D. Lee
*Assistant Examiner*—John Ngo

[57] ABSTRACT

An adhesiveless connector 1 for a fiber optic cable 3 has an alignment ferrule 7 with a tubular passageway 24 for encircling an optical member 3 having a jacket 6 and fiber 2 and a tip 8 with centrally disposed aperture 16 for closely receiving an end of the fiber 2 from the tubular passageway 24. An internal precision alignment surface 15 leads from the tubular passageway 24 to the aperture 16. The ferrule 7 has locking means 10 at its rear end for gripping the jacket 6 of the optical member 3 and a clamping means comprising a collet 48 with compression ring portion 54 for gripping the fiber buffer 4. The compression ring portion 54 is urged radially by the inner surface 23 of the tip 8 to compress against the fiber buffer 4 for alignment of the end of the fiber 2 within the aperture of the ferrule 16.

19 Claims, 2 Drawing Sheets

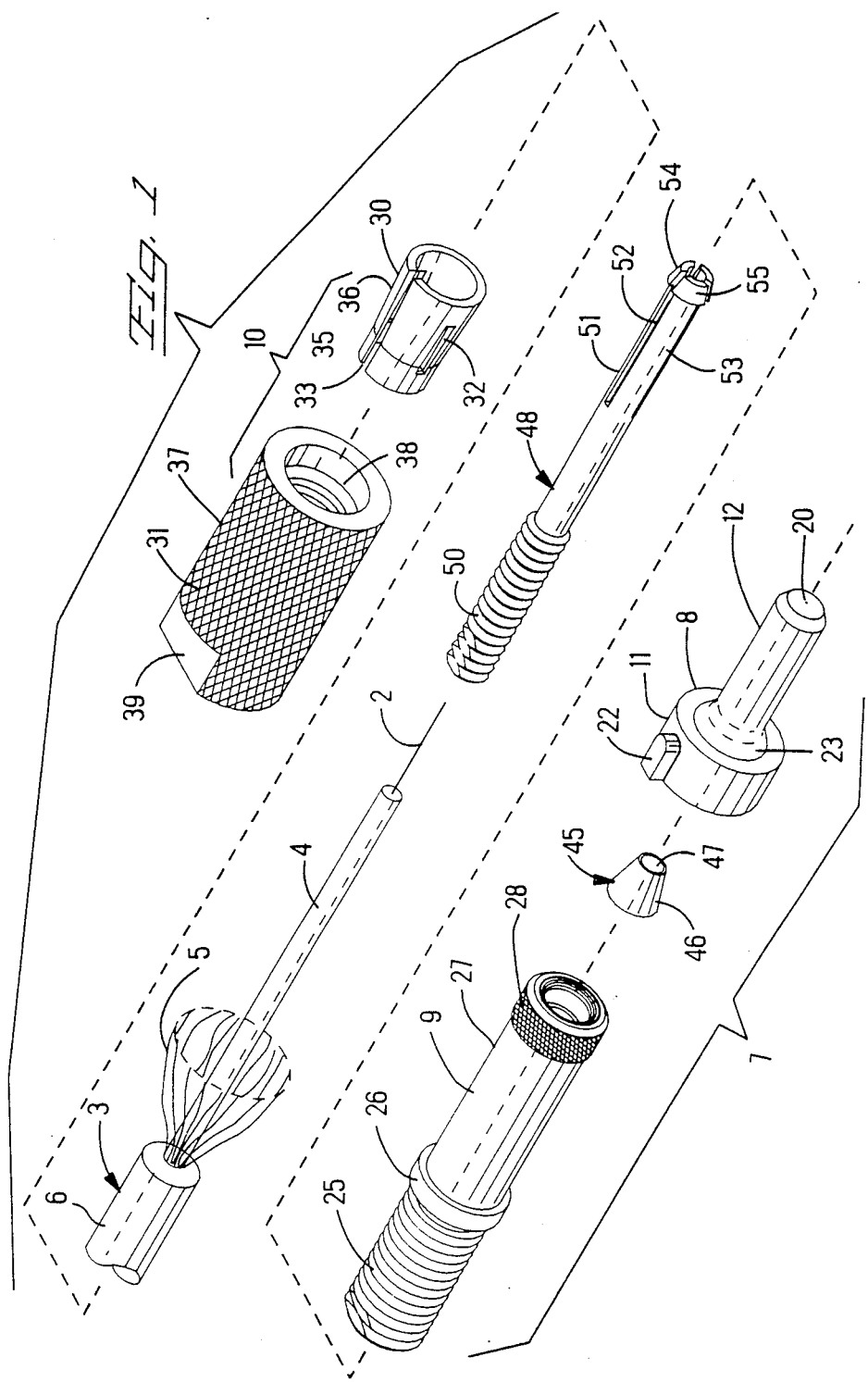

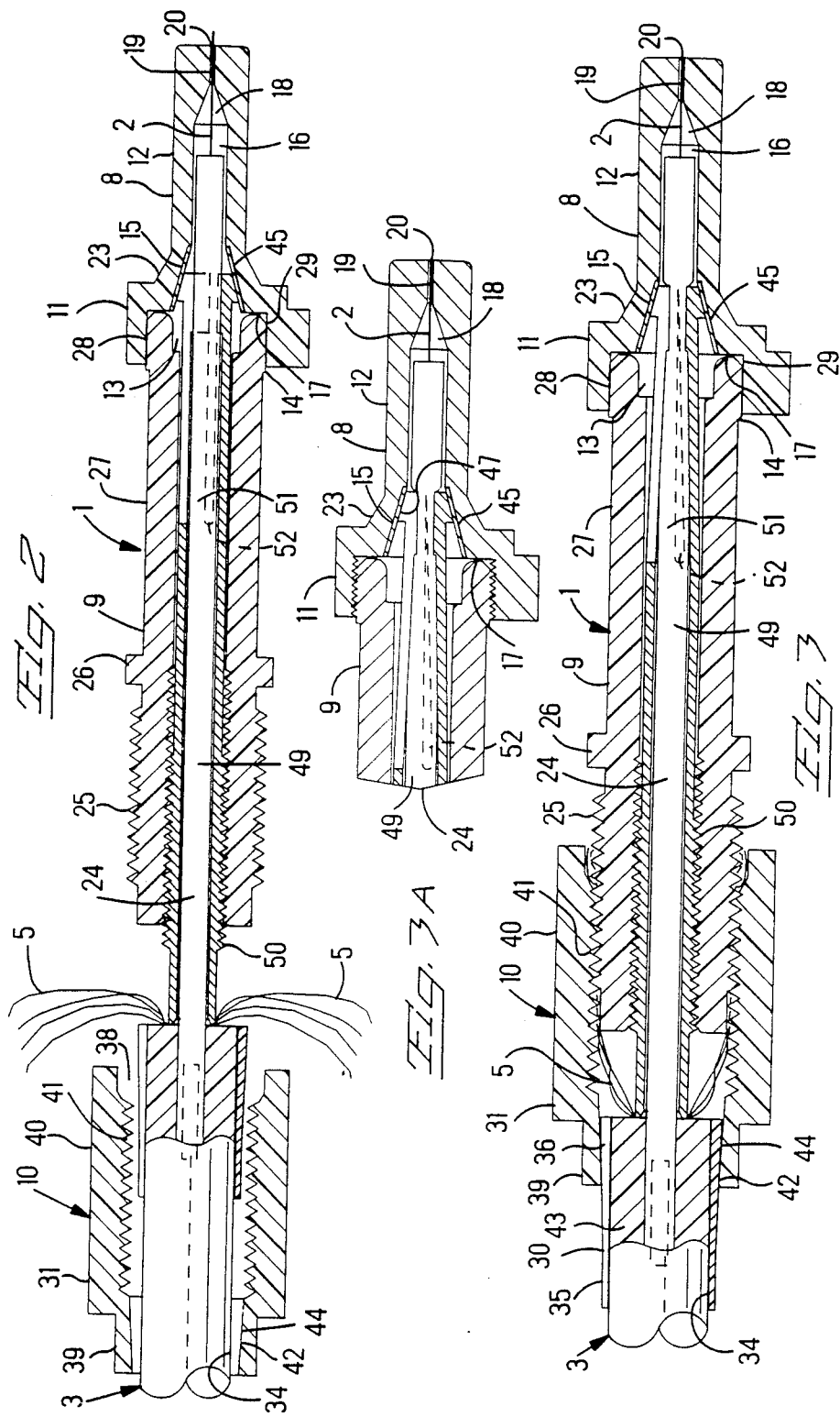

CONNECTOR WITH PRECISION FIBER OPTIC ALIGNMENT CLAMP

FIELD OF THE INVENTION

The invention relates to an adhesiveless connector for an optical fiber. The connector is characterized by locking of the optical fiber with a rear lock preventing the fiber from backing out of the connector and by a forward clamp being a precision alignment clamp.

BACKGROUND OF THE INVENTION

Adhesives are used to secure an optical fiber in a connector. The use of adhesives positions the fiber and permits polishing of the fiber end without concern for the fiber becoming displaced. The arrangement is disadvantageous in that it is slow, requiring time for the adhesive to cure before the polishing operation can take place. Frequently, this means that a connector using adhesives may not be satisfactory for field applications because of the influence on curing of weather conditions or the difficulty to effectuate curing at an inaccessible location where the connector is to be used.

A known adhesiveless optical fiber connector is that disclosed in Huber, U.S. Pat. No. 4,679,895, wherein a connector is formed by a ferrule for surrounding the optical fiber and a clamp of resiliently, compressible material fitted within the ferrule. A body is provided for connection to the ferrule, the body having a tubular portion divided into fingers, which are utilized for gripping the buffer jacket surrounding the optical fiber. The clamp is surrounded, in part, by the fingers of the body. Another portion of the clamp is fitted within the ferrule and is urged by the fingers of the body against an internal surface of the ferrule. The ferrule surface causes the clamp to deform radially to grip the fiber. Furthermore, the fingers are urged by the internal surface of the ferrule to compress radially against the fiber buffer jacket. A compressible clamp of elastomeric material differs from a rigid and hard clamp. A connector, according to the present invention, utilizes a rigid and hard clamp, as well as a locking means to prevent backing out of the optical fiber from the passageway of the connector. By eliminating a thermoplastic material, a precision alignment of the optical fiber is provided; the alignment following precisely the definition of the inner surface of the connector, which converges via a truncated, conical shape to a precisely centrally disposed aperture.

Rhodes, U.S. Pat. No. 4,607,911, relates to a connector with collet-type chuck means and clamp. Differing is a connector utilizing the combination of a collet clamping means and a clamping guide so that precision alignment is obtained even with connector tips of deformable material. Further, the instant connector uses a locking means to prevent relative movement of the optical fiber, which movement would cause misalignment at the connector tip.

SUMMARY OF THE INVENTION

An object of the invention is to provide a precisely defined alignment of an optical fiber within a connector by providing an inflexible, nondeformable precision alignment clamp. It is a further object of the present invention to provide a precise alignment whether the tip of the precision connector is of a hard, nonformable material, such as brass or the like, or is wholly or partially made of a deformable material. A feature of the present invention is directed to a fiber optic clamping means, which may be cammed radially by the inner precision surface of an alignment ferrule to compress uniformly and radially against the fiber without intermediate compressible material between the precision surface and the fiber, so as to assure a precise alignment.

Another feature of the present invention is to provide a locking means to prevent a fiber optic cable from backing out of a connector. Such backing out could destroy the precision alignment of the cable and, further, could result in imperfect connection resulting in loss in conductibility.

The present invention is a connector for optical fibers having a jacket and a fiber. The connector comprises an alignment ferrule with a tubular passageway for encircling the optical member, a tip with a centrally disposed aperture therethrough for closely receiving an end of the fiber from the tubular passageway, and an internal precision alignment surface in the shape of a truncated cone leading from the tubular passageway to the centrally disposed aperture. The alignment ferrule may be entirely of a hard metal material, such as brass, or as is an advantage with the present invention, in whole or part of a deformable thermoplastic material. The alignment ferrule further includes a fiber clamp guide of hard, nondeformable material. The clamp guide is a truncated, conical body with an outer surface and an inner camming surface. The outer surface resides against and is aligned with the precision alignment surface of the alignment ferrule.

Further, the alignment ferrule has a locking means at the rear end of the tubular passageway for gripping the jacket of the optical member to prevent the member from backing out of the tubular passageway and a clamping means for gripping the fiber within the alignment ferrule. The locking means may comprise a nut having through passage, narrower from front to rear, and a compression sleeve fitted within the passage of the nut. The nut may be threadably connected to the rear end of the alignment ferrule body so that as the nut is threaded to the ferrule, the compression sleeve is forced into a progressively narrower portion of the through passage. The sleeve constricts as it is forced into the narrower portion and constricts around the body of a fiber optic cable to thereby lock the cable into place within the body of the connector.

The clamping means comprises a collet with a clamping ring portion for intimately gripping the fiber within the alignment ferrule. The clamp is cammed radially by the inner surface of the fiber clamp guide fitted against the inner surface of the alignment ferrule, to compress uniformly and radially against the fiber for a close alignment of the end of the optical fiber with the centrally disposed aperture of the alignment ferrule.

Other advantages and aspects of the invention are apparent by way of example from a detailed description that follows and from the accompanying drawings.

DESCRIPTION OF THE DRAWINGS

FIG. 1 is a fragmentary, perspective view of a connector and an optical cable.

FIG. 2 is an enlarged section view through the connector of the present invention.

FIG. 3 is an enlarged section view through a fully assembled and terminated connector.

FIG. 3A is a detail through the alignment ferrule of an assembled connector.

With reference to FIGS. 1 to 3, is shown a connector 1 for an optical fiber 2 of an optical fiber cable 3. The cable 3 is of known construction and includes a flexible buffer 4, concentrically encircling the fiber 2, multiple strands of strength members 5 extending axially of the buffer 4 and distributed around the periphery of the buffer 4, and an external jacket 6. It is notable at this point that oftentimes, optical fiber cables which are to be terminated in a connector, are associated and assembled together with a hollow, cylindrical, metal crimp ferrule. It is notable that with the connector of the present invention, no crimp ferrule is necessary.

Alignment ferrule 7 of the shown embodiment of the present invention, consists of several parts, a tip 8, a threaded ferrule 9 and locking means 10. The tip 8 is a unitary, integrated body with flange portion 11 and nose portion 12. The tip 8 may be made up of a hard metal material, such as brass; but in the embodiment shown, the tip is of deformable material, such as thermoplastic. The tip 8 has a profile through passage 13 with entry section 14, truncated conical surface 15 leading to exit passage 16. Entry section 14 meets truncated conical surface 15 to form shoulder 17. Profiled axial bore 18 is aligned with exit passage 16, leading to narrow exit bore !9 at front mating surface 20. In FIG. 1, the outside of the tip 8 is profiled by key 22 and tapered surface 23 between flange 11 and nose 12. Nose 12 provides a precision alignment surface for low loss connection.

Threaded ferrule 9 is an elongated, sleeve body having a through passage 24, extending through the ferrule 9 which, further, has outwardly directed threads 25 at its rearward end and adjacent to outer flange 26. Barrel-shaped forward section 27 ends in an outer knurled surface 28.

Threaded ferrule 9 may be fitted to tip 8 by ultrasonics or heating or by adhesive or mechanical means; preferably threaded ferrule 9 is fitted to tip 8 by heating inner surface 29 of entry section 14 to cause the deformable material of the tip 8 to become soft and flowable. The knurled surface 28 of the threaded ferrule 9 is fitted against inner surface 29 and heated material of the surface 29 flows within the interstices of the knurling 28. Upon cooling, this interflowing creates a bonding between tip 8 and threaded ferrule 9.

Locking means 10 is a two-part section comprising compression sleeve 30 and nut 31. The compression sleeve 30 is C-shaped with longitudinal compression relief slots 32. Slot 33, which forms the open mouth of the C, runs the full length of the sleeve. The walls 34 of the sleeve 30 are thicker from the rear section 35 to the forward section 36, so that although the inner diameter of the sleeve 30 is uniform, the outside diameter increases from the rear section 35 to the forward section 36.

Nut 31 is a ferrule with knurled outer surface 37, through passage 38 and head portion 39. The forward section 40 of through passage 38 has inwardly directed threads 41 for threading with threads 25 of ferrule 9 as hereinafter described. The inside diameter of the forward section 40 of nut 31 is substantially (except threading) of uniform diameter while it is notable that the rear section 42 of through passage 38 is of decreasing diameter approaching the rear entry 43 of nut 31 to form a surface 44 for contact to rear section 35 of compression sleeve 30, again as hereinafter described.

Clamping guide 45 is a truncated cone-shaped piece made of a hard, nondeformable material with outer sloping surface 46 for close fitting to the precision, truncated surface 15 of tip 8 and with inner sloping surface 47 for contact with collet 48, again as hereinafter described.

Collet 48 is a ferrule of uniform through passage 49 (while not compressed), and having an outwardly threaded rear section 50, forward end 51 with longitudinal slots 52 which form fingers 53, ending in compression ring 54. Compression ring 54 is of uniform inner diameter but forms a head on the end of each finger 54 with forward sloping surface 55.

With the present invention, the clamping guide 45 is fitted within tip 8 and is confined therein by truncated, conical surface 15. Collet 48 fits within the through passage 24 of threaded ferrule 9, with forward sloping surface 55 of head 55 contacting the inner sloping surface 47 of clamping guide 45. Referring to FIG. 3A, ferrule 9 is shown with outward threads 56 on forward section 27. This connects with inward threading 57 of surface 29 of tip 8, illustrating another embodiment of the present invention whereby ferrule 9 is threaded to tip 8.

Referring again to FIGS. 1 to 3, the present invention is utilized with a standard optical fiber cable 3 by first preparing the cable 3 in known fashion to expose a section of the buffer 4 and fiber 2, within the compression sleeve 30, which is held in place by the mating contact surface 44 of nut 31, which in turn is threadably connected to threaded ferrule 9. The end of the stripped external jacket 6 of the cable 3 abuts the rear section 50 of collet 48, while fiber 2 and buffer 4 pass into the uniform through passage 49 of collet 48. While nut 31 is threaded to outward threading 25 of the elongated ferrule 9, the compression sleeve 30 is drawn toward the rear end 50 of collet 48 until the optical fiber 2 within the sleeve 30 abuts the rear end 50. As the nut 31 is further tightened, rear contact surface 44 of nut 31 compresses the compression sleeve inward and against the external jacket 6 of the cable 3 to form a locking connection. Further, strength members 5 are captured by the interthreading of outward threads 25 of ferrule 9 and inward threads 41 of nut 31 to further lock the fiber optic cable 3. It is notable that this locking connection acts to prevent the cable from backing out of the collet 48 and alignment ferrule 7 and further insulates the connection from down line agitation which would adversely affect the precision connection at tip 8. It is further notable that this locking mechanism does away with the necessity of a crimped sleeve, which is the usual device that provides a locking mechanism.

Forward of the locking means 10, while nut 31 is threaded onto threaded ferrule 9, the assembly of the optical fiber 2, flexible buffer 4 and collet 48, is driven forward to engage the inner sloping surface 47 of clamping guide 45. Engagement with surface 47 cams the head 55 of collet 48 downward on fiber buffer 4 to provide a precision alignment of the optical fiber 3 and buffer 4 through the profiled axial bore 18 of tip 8 and the fiber 3 to the narrow exit board 19.

It is further notable that the assembly of the connector of the present invention characterized by a precision fiber optic alignment clamp and locking means may be accomplished by a simple wrench without the necessity of any special crimping tools. This is a particular advantage of use of the connector of the present invention in the field or in adverse conditions as previously noted, and also of particular advantage in ease of manufacturing.

We claim:

1. A connector for an optical fiber cable, comprising; an alignment ferrule having a passageway,
buffer clamping means extending in the passageway including a collet clamping portion secured to a buffer surrounding an optical fiber of an optical fiber cable,
a tip on a front end of the alignment ferrule having a mating face receiving the optical fiber projecting from the buffer and from the buffer clamping means,
camming means engaging the buffer clamping means for camming the collet clamping portion on the buffer,
means on the buffer clamping means rearward of the collet clamping portion for being secured to the interior of the alignment ferrule,
cable clamping means for closing onto and clamping the cable, and
locking means for movement forwardly along a rear of the alignment ferrule to provide resistance to disengagement of the buffer clamping means and the alignment ferrule.

2. A connector as recited in claim 1, comprising; the cable clamping means being engaged by the locking means to close onto and clamp the cable.

3. A connector as recited in claim 2 comprising; the buffer clamping portion and the locking means being threaded to the alignment ferrule.

4. A connector as recited in claim 2, comprising; the camming means includes a truncated cone shaped hard material in the tip.

5. A connector as recited in claim 1, comprising; the buffer clamping portion and the locking means being threaded to the alignment ferrule.

6. A connector as recited in claim 5, comprising; the camming means includes a truncated cone shaped hard material in the tip.

7. A connector as recited in claim 1, comprising; the tip being a separate part and being secured by threads onto a remainder of the alignment ferrule.

8. A connector as recited in claim 7, comprising; the buffer clamping portion and the locking means being threaded to the alignment ferrule.

9. A connector as recited in claim 7, comprising; the camming means includes a truncated cone shaped hard material in the tip.

10. A connector as recited in claim 7, comprising; the collet having an inclined portion facing the camming means, and the camming means is in the separate tip.

11. A connector as recited in claim 10, comprising; the buffer clamping portion and the locking means being threaded to the alignment ferrule.

12. A connector as recited in claim 10, comprising; the camming means includes a truncated cone shaped hard material in the tip.

13. A connector as recited in claim 1, comprising; a projecting key on the tip.

14. A connector as recited in claim 13, comprising; the buffer clamping portion and the locking means being threaded to the alignment ferrule.

15. A connector as recited in claim 13, comprising; the camming means includes a truncated cone shaped hard material in the tip.

16. A connector as recited in claim 1, comprising; the camming means includes a truncated cone shaped hard material in the tip.

17. A connector as recited in claim 1, comprising; the locking means being a nut threadable onto the alignment ferrule and encircling the cable clamping means.

18. A connector as recited in claim 17, comprising; the buffer clamping portion and the locking means being threaded to the alignment ferrule.

19. A connector as recited in claim 17, comprising; the camming means includes a truncated cone shaped hard material in the tip.

* * * * *